E. P. SHAW.
HEDGE-TRIMMER.

No. 173,564. Patented Feb. 15, 1876.

WITNESSES:
Chas. Nieta
Alex F. Roberts

INVENTOR:
Edgar P. Shaw
BY
ATTORNEYS.

UNITED STATES PATENT OFFICE.

EDGAR P. SHAW, OF CHATHAM CENTRE, OHIO.

IMPROVEMENT IN HEDGE-TRIMMERS.

Specification forming part of Letters Patent No. 173,564, dated February 15, 1876; application filed December 18, 1875.

*To all whom it may concern:*

Figure 1:
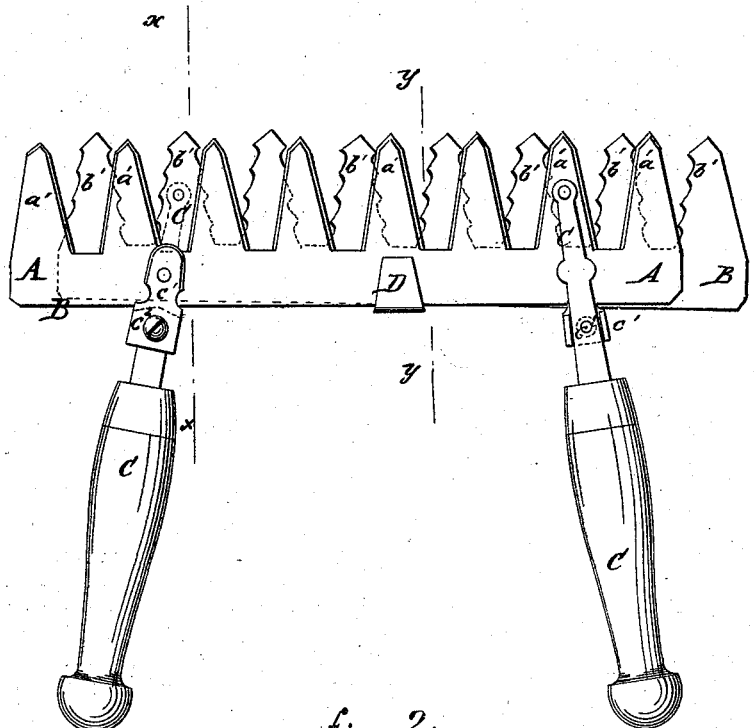
Figure 2:
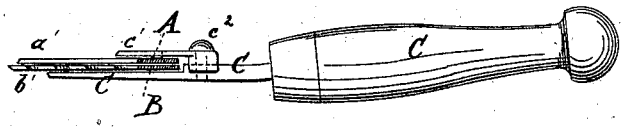
Figure 3:
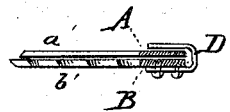

Be it known that I, EDGAR PORTER SHAW, of Chatham Centre, in the county of Medina and State of Ohio, have invented a new and useful Improvement in Hedge-Trimmer, of which the following is a specification:

Figure 1 is a top view of my improved hedge-trimmer. Fig. 2 is a cross-section of the same, taken through the line $x\ x$, Fig. 1. Fig. 3 is a cross-section of the same, taken through the line $y\ y$, Fig. 1.

Similar letters of reference indicate corresponding parts.

The object of this invention is to furnish an improved instrument for trimming hedges, which shall be so constructed that it will enable hedges to be trimmed faster and more evenly than when the ordinary instruments are used, and which shall be simple in construction, light, strong, and durable, and convenient in use.

The invention will first be described in connection with drawing, and then pointed out in the claim.

A and B are two steel plates, of suitable length and thickness, and upon the forward edges of which are formed teeth $a'\ b'$. The teeth $a'\ b'$ are made slightly tapering, are about two inches wide at the base, and have spaces about half an inch wide between them. The edges of the teeth $a'$ of the upper plate A are made smooth, and the edges of the teeth $b'$ of the lower plate B are scalloped. This form of the edges makes the teeth cut better, and prevents the branches or twigs from slipping out without being cut.

C are the handles, the forward parts of which have shoulders formed upon them to receive the plates A B, and their forward ends are pivoted, the one to a tooth of the plate A, and the other to a tooth of the plate B.

$c^1$ are short arms, which have lips formed upon the side edges of their bases to overlap the sides of the handles C, and are secured to the shoulders of said handles by screws $c^2$. The forward part of one of the arms $c^1$ overlaps and is pivoted to the plate B, and the forward part of the other arm overlaps and is pivoted to the plate A. The plates A B are further kept in place upon and in close contact with each other by one or more U-clamps, D, which are riveted to one or the other of said plates, as shown in Fig. 3.

By this construction, by moving the two handles C toward and from each other, the two plates A B will be moved in opposite directions, and the teeth $a'\ b'$ will operate with a slight drawing cut.

With a trimmer thus constructed hedges can be trimmed very rapidly and very evenly.

By taking out the screws $c^2$ the plates A B can be readily taken apart for sharpening the teeth $a'\ b'$, or for any other desired purpose.

Having thus described my invention, I claim as new and desire to secure by Letters Patent—

The combination of handles C C, shouldered on their forward parts, one pivoted to a tooth of plate A, and the other to a tooth of plate B, with short pivoted overlapping arms $c^1$, having lips upon side edges, the screws $c^2$, and the U-clamps D, to allow the said plates A B to be operated, in the manner and for the purpose specified.

EDGAR PORTER SHAW.

Witnesses:
JONATHAN PACKARD,
WILLIAM A. SHAW.